United States Patent [19]

Nogami et al.

[11] Patent Number: 5,725,982
[45] Date of Patent: Mar. 10, 1998

[54] PHOTOCONDUCTOR FOR ELECTROPHOTOGRAPHY

[75] Inventors: Sumitaka Nogami; Michihiro Kitazawa; Katsuhiro Sato, all of Kawasaki, Japan

[73] Assignee: Fuji Electric Co., Ltd., Kanagawa, Japan

[21] Appl. No.: 645,905

[22] Filed: May 14, 1996

[30] Foreign Application Priority Data

May 18, 1995 [JP] Japan ............... 7-119511

[51] Int. Cl.$^6$ ............... G03G 5/047
[52] U.S. Cl. ............... 430/58; 430/66
[58] Field of Search ............... 430/58, 59, 96, 430/66

[56] References Cited

U.S. PATENT DOCUMENTS 5,382,489  1/1995  Ojima et al. ............... 430/96
5,418,099  5/1995  Mayama et al. ............... 430/96

FOREIGN PATENT DOCUMENTS

| 63-70256A | 3/1988 | Japan . |
| 1-169456A | 7/1989 | Japan . |
| 6-62039 | 3/1994 | Japan . |
| 6-62040 | 3/1994 | Japan . |

Primary Examiner—John Goodrow
Attorney, Agent, or Firm—Spencer & Frank

[57] ABSTRACT

In order to provide a laminate type organic photoconductor for electrophotography excellent in abrasion resistance and having enhanced stability of characteristics and high productivity, a binder resin of a charge transport layer as an outermost layer of the laminate type photoconductor includes a specified copolymer polycarbonate resin containing at least one constitutional unit of those represented by a formula (1) and at least one constitutional unit of those represented by a formula(2).

4 Claims, 1 Drawing Sheet

5,725,982

PHOTOCONDUCTOR FOR ELECTROPHOTOGRAPHY

BACKGROUND OF THE INVENTION

1. Field of the Invention

The present invention relates to a photoconductor for electrophotography, in which a charge generation layer and a charge transport layer are laminated on a conductive substrate. More particularly, the present invention relates to a laminate type organic photoconductor for electrophotography, in which a charge transport layer as an outermost layer of the photoconductor includes a copolymer polycarbonate resin having a specified structure.

2. Description of the Prior Art

In recent years, electrophotography has been widely utilized in the fields of copying machines as well as various types of printers and facsimiles because it can form an image of good quality with high instantaneousness.

A material of a photoconductor for electrophotography, forming the heart of electrophotography, has been changed from a conventionally-used inorganic material such as selenium, an arsenic-selenium alloy, cadmium sulfide or zinc oxide to an organic material having advantages of non-pollution and easy film formation.

As such organic photosensitive materials, there have been known a dispersion single-layer type and a laminate type. In the former, a photosensitive layer is obtained by dispersing organic photoconductive fine powder into a binder. In the latter, as illustrated in FIG. 1, a photosensitive layer 4 is constituted of a charge generation layer 2 and a charge transport layer 3 laminated on a conductive substrate 1.

The laminate type photoconductor is dominant for the following reasons: a photoconductor of high sensitivity can be provided by laminating the charge generation layer 2 and the charge transport layer 3 which are formed of highly efficient charge generation and transporting substances, respectively; a photoconductor of high safety can be attained with a wide selection of materials; and a photoconductor can be obtained with high productivity at a relatively reduced cost. In this laminate type organic photoconductor, the charge transport layer 3 as an outermost layer larger in thickness than the charge generation layer 2 is laminated on the charge generation layer 2 in consideration of durability of practical products since the charge generation layer 2 is relatively thin.

As illustrated in FIG. 1, a coating liquid is prepared by dispersing and dissolving a charge generation substance 5 in an organic solvent together with a suitable binder, to be applied onto the conductive substrate 1, thereby forming the charge generation layer 2. Furthermore, another coating liquid is prepared by dispersing and dissolving a charge transport substance 6 in an organic solvent together with a suitable binder resin, to be applied onto the charge generation layer 2, thus forming the charge transport layer 3. The charge generation layer 2 and the charge transport layer 3 constitute the photosensitive layer 4.

The photoconductor for electrophotography is generally required to have electric, mechanical, chemical and optical characteristics according to an electrophotographic process to be utilized. Particularly, since the surface layer of the photoconductor directly suffers from electric, mechanical, chemical and optical stresses in repeated use in treatment processes such as electric charge, exposure, development, transfer to paper and cleaning, resistances against those stresses are required. Namely, the photoconductor is required to have resistance against deterioration in characteristics (e.g., deterioration in sensitivity or electric chargeability, an increase in residual potential and the like) due to ozone generated when its photosensitive layer is electrically charged, and resistance against slide contact which occurs at the surface in a developing, transferring or cleaning process.

Since the surface of the organic photoconductor, i.e., the charge transport layer 3 is composed of mainly the binder resin, characteristics of the resin have a great influence on those of the surface of the photoconductor. Conventionally, polycarbonate resins including bisphenol A as a raw material (hereinafter referred to as "bisphenol A type polycarbonate resins") have been used as resins which can fulfill the above requirements.

However, the bisphenol A type polycarbonate resins cannot satisfy all the above requirements, and have problems as follows:

(1) They are poor in solvent solubility. They exhibit good solubility with respect to only part of halogen-based hydrocarbons such as dichloromethane and 1,2-dichloroethane. These halogen-based hydrocarbons have a relatively low boiling point. If a photoconductor is fabricated by using a coating liquid prepared with such a solvent, a coating film is liable to be whitened. Moreover, it takes much time and effort to manage the coating liquid in a solid state.

(2) Examples of solvents other than halogen-based hydrocarbons are tetrahydrofuran, dioxane and cyclohexanone and mixture solvents thereof. Although the bisphenol A type polycarbonate resins are partly soluble in such solvents, their solutions are liable to gel within several days due to its low stability with time, whereby they are unsuitable for mass production of a photoconductor.

(3) In the case the polycarbonate resin includes partly or mainly bisphenol A, solvent cracking is likely to occur on the formed coating layer.

The solvent stability described in (1) and (2) could be substantially attained by using a bisphenol Z type polycarbonate resin having a bulky cyclohexylene group in the constituent unit of the resin. Meanwhile, resistance against solvent cracking pointed out in (3) has not been sufficiently obtained yet by using a bisphenol Z type polycarbonate resin.

In order to solve the above problems, Japanese Patent Application Laying-open No. 62040/1986 discloses a method for mixing a bisphenol A type polycarbonate resin with a bisphenol Z type polycarbonate resin so as to reduce generation of cracks on a formed coating layer; and Japanese Patent Application Laying-open No. 62039/1986 discloses a method for copolymerizing bisphenol A and bisphenol Z so as to reduce generation of cracks on a formed coating layer. Neither methods could have reached yet satisfactory prevention of generation of cracks.

A large quantity of a low molecular compound such as a charge transport substance is frequently used in order to fill the recent demand for high sensitivity of an organic photoconductor for electrophotography. This, however, deteriorates stability with time of a coating liquid or mechanical strength of a coating film.

SUMMARY OF THE INVENTION

The present invention has been accomplished in an attempt to solve the above problems experienced by the prior art. It is an object of the present invention to provide a durable photoconductor for electrophotography, in which stability of electric, mechanical, chemical and optical characteristics can be enhanced by using a binder resin excellent in solvent solubility, having high stability with time of a coating liquid, and capable of forming a coating film excellent in solvent crack resistance, stress crack resistance and abrasion resistance.

In order to achieve the above object, a photoconductor for electrophotography according to the present invention comprises:

a conductive substrate; and a photosensitive layer formed on the conductive substrate, the photosensitive layer having a charge generation layer and a charge transport layer, each layer being made of organic material mainly;

wherein the charge transport layer which is formed as an outermost layer includes a copolymer polycarbonate resin containing at least one constitutional unit of those represented by the following formula (1) and at least one constitutional unit of those represented by the following formula (2):

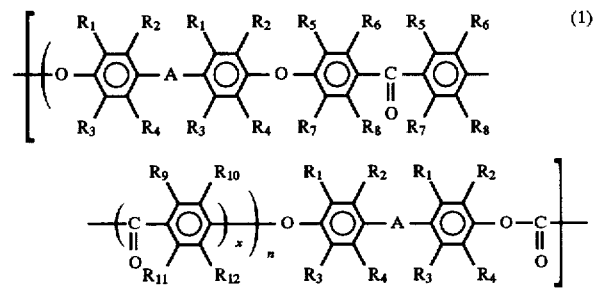

wherein A denotes any one of alkylidene group, cycloalkylidene group, allylene group, and allylene dialkylidene group; R1 to R12 individually denote any one of hydrogen atom, alkyl group, aryl group, and halogen atom; x is an integer of 0 or 1; and n denotes any one of 1 to 100.

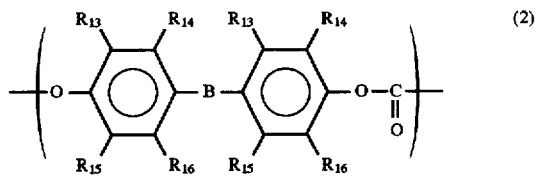

wherein B denotes any one of alkylidene group, cycloalkylidene group, allylene group, and allylene dialkylidene group; and R13 to R16 individually denote any one of hydrogen atom, alkyl group, aryl group, and halogen atom.

In the above construction, the constitutional unit represented by the formula (1) preferably is 1 to 60 percent by weight, and more preferably, 5 to 50 percent by weight based upon a total amount of the copolymer polycarbonate resin.

The copolymer polycarbonate resin preferably has a molecular weight of 100,000 to 200,000 in polystyrene weight-average molecular weight.

The above and other objects, effects, features and advantages of the present invention will become more apparent from the following description of an embodiment thereof taken in conjunction with the accompanying drawings.

DESCRIPTION OF THE PREFERRED EMBODIMENT

Figure 1:
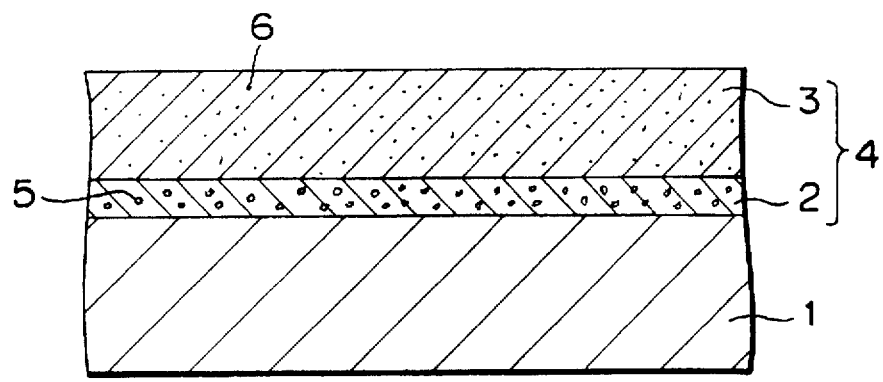
FIG. 1 is a cross sectional view illustrating a conventional photoconductor for electrophotography.
Figure 2:
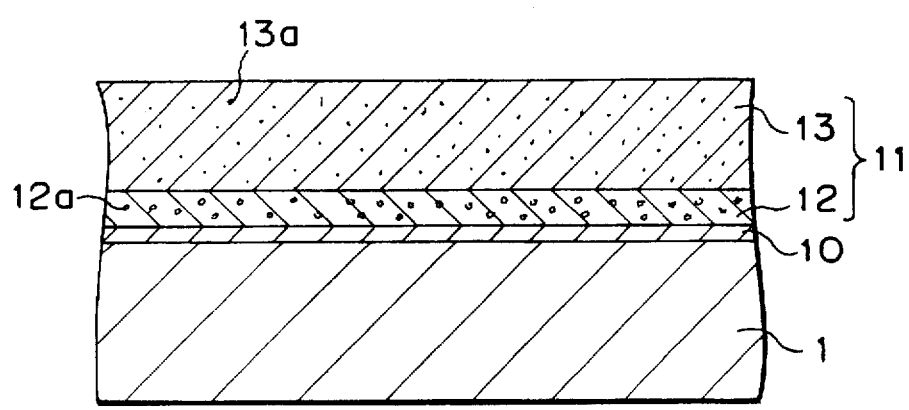
FIG. 2 is a cross sectional view illustrating one example of a photoconductor for electrophotography according to the present invention.

FIG. 2 is a cross sectional view illustrating one example of a photoconductor for electrophotography according to the present invention.

As shown in FIG. 2, the photoconductor of the present invention comprises a conductive substrate 1, an undercoat layer 10 formed on the conductive substrate 1 as required, and a photosensitive layer 11 formed on the undercoat layer 10. The photosensitive layer 11 is structured of a charge generation layer 12 formed on the undercoat layer 10 and a charge transport layer 13 formed on the charge generation layer 12.

Materials used for the conductive substrate 1 of the present invention are metals such as aluminum, stainless steel, nickel, etc.; a polyester film, a phenol resin pipe, a paper pipe, or a glass pipe having a conductive layer formed on the surface and composed of aluminum, copper, palladium, tin oxide, indium oxide, etc.; and further, plastics containing conductive powder, which is dispersed therein, such as carbon black, metal powder, or metal oxide powder, etc.

As described above, the undercoat layer 10 which functions to serve as a barrier and to provide adhesion may be provided on the conductive substrate 1 as required. Materials used for the undercoat layer 10 are resins of such as polyvinyl butyral, polyvinyl alcohol, casein, polyamide, cellulose, gelatin, polyurethane, and polyester resins and the like, and further, metal oxides such as aluminum oxide and the like. Preferably, the undercoat layer 10 is a film having a 0.1 μm to 10 μm thickness.

The charge generation layer 12 uses a charge generation substance 12a. Examples of the charge generation substance 12a which may be used are organic pigments such as phthalocyanine pigment, quinacridone pigment, indigo pigment, perylene pigment, polycyclic quinone pigment, anthoanthrone pigment, benzimidazole pigment, etc. The above-mentioned pigments are used by binding their particles using various binder resins such as polycarbonate resin, polyvinyl acetate, polyacrylic ester, polymethacrylic acid, vinyl-chloride based copolymer, polyester, polyvinyl acetoacetal, polyvinyl propional, polyvinyl butyral, phenoxy resin, epoxy resin, urethane resin, cellulose ester, cellulose ether, and the like. 30 to 500 parts by weight of the charge generation substance 12a is mixed with 100 parts by weight of these binder resins. Generally, the film thickness of the charge generation layer 12 is generally within the range of 0.1 μm to 1 μm.

Examples of usable charge transport substances 13a contained in the charge transport layer 13 are enamine-based compounds, styryl-based compounds, hidrazone-based compounds, butadiene compounds, amine compounds, etc. Such charge transport substance 13a and binder resin containing polycarbonate resin of the present invention are dissolved to prepare a coating liquid. The coating liquid is applied onto the charge generation layer 12 to form a coating film with a thickness of 10 μm to 40 μm. Examples of solvents for preparing the above coating liquid are aromatic hydrocarbons such as benzene, toluene, xylene, etc.; ketones such as acetone, metylethyl ketone, diethyl ketone, methylisobutyl ketone, cyclohexanone, dichlopenthanone, etc.; esters such as methyl acetate, ethyl acetate, methylpropionate, methylcellosolve, ethylcellosolve, etc.; alcohols such as methanol, ethanol, propanol, buthanol, etc.; ethers such as tetrahydrofuran, dioxane, dimethoxymethane, dimethoxyethane, diglyme, etc.; hydrocarbon halides such as carbon tetrachloride, chloroform, methylene chloride, dichloroethane, trichloroethylene, chlorobenzene, etc.; amides such as N,N-dimethylform amide, N,N- dimethylacetoamide, etc.; dimethyl sulfoxide; and 4-methoxy-4-methylpentanone-2. These solvents may be used singly or may be suitably combined and mixed. Additionally, a leveling agent and a plasticizer may be added into the charge transport layer 13 in order to enhance film forming capability and coating capability. An oxidation inhibitor and an ultraviolet absorber may be added into the charge transport layer 13 in order to enhance ozone resistance and Nox resistance, and ultraviolet light resistance.

Copolymer polycarbonate resins of the present invention may be used as a mixture in combination with other binder resins. Examples of resins which may be used in combination are polycarbonate resin (other than copolymer polycarbonate resin of the present invention), polyester resin, polyphenylene ether resin, polysulfone resin, polyketone resin, polystyrene resin, polyacrylate ester resin, poly-methacrylate ester resin, AS resin, ABS resin and the like. It is desirable to use the abovementioned copolymer polycarbonate resins of the present invention amounting to 50% or more percent by weight of the total binder resins so that the present invention can effectively produce advantageous effects.

Copolymer polycarbonate resins of the present invention having the constitutional units indicated in the foregoing paragraph can be readily synthesized by condensation reaction of a bisphenol compound (A) and a bisphenol compound (B) which are respectively represented by the following formulas by common methods such as a phosgene method or a diphenylcarbonate exchange method.

The above-mentioned bisphenol compound (A) is represented by the formula shown below.

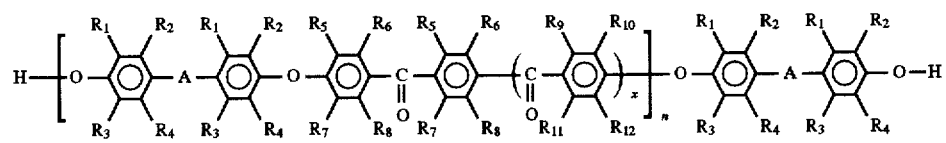

wherein A denotes any one of an alkylidene group, a cycloalkylidene group, an allylene group, and an allylene dialkylidene group; and R1 to R12 individually denote any one of a hydrogen atom, an alkyl group, an aryl group, and a halogen atom; x is an integer of 0 or 1; and n is any one of integers of 1 to 100.

Specific examples of the bisphenol compound (A) represented by the above formula are shown below.

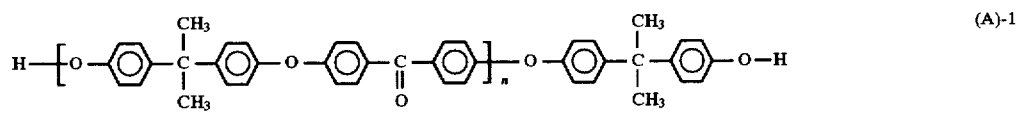
(A)-1

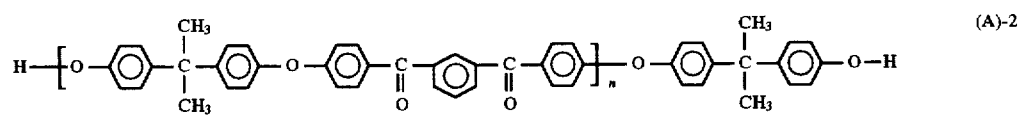
(A)-2

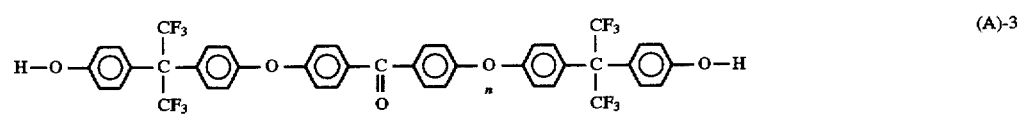
(A)-3

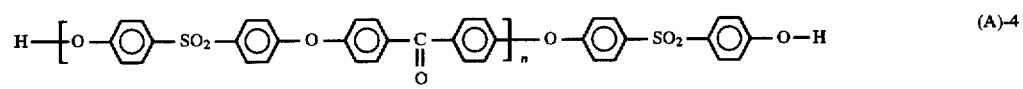
(A)-4

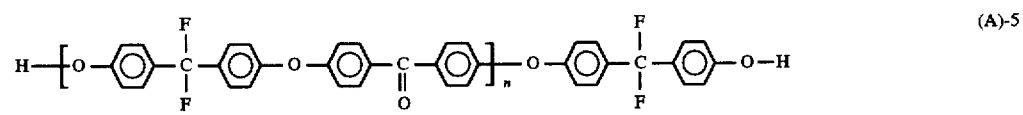
(A)-5

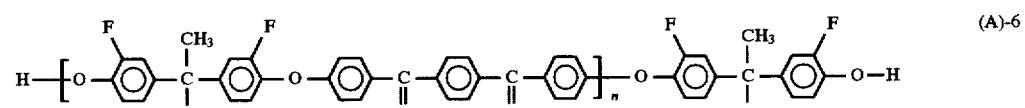
(A)-6

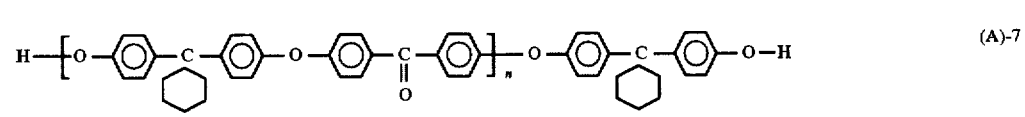
(A)-7

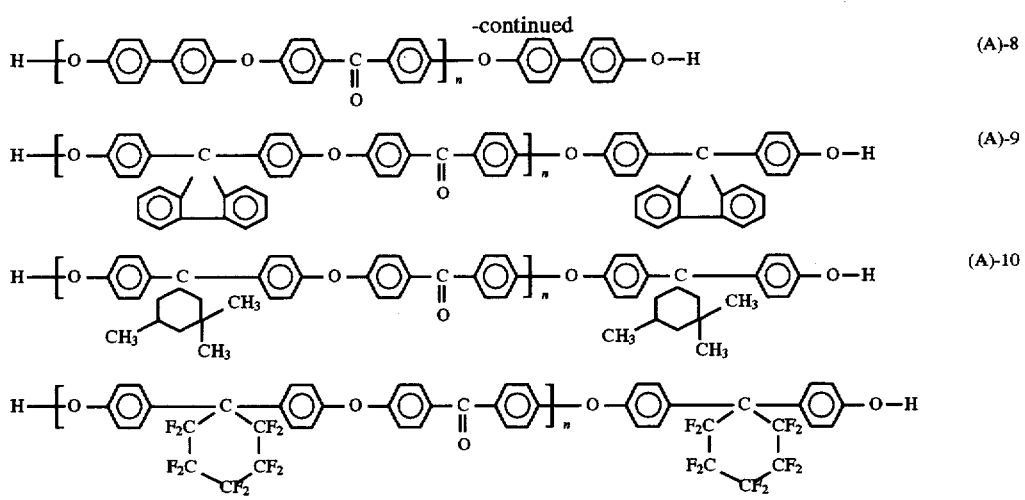

Further, the bisphenol compound (B) is represented by the following formula.

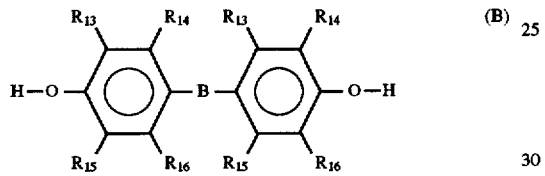

wherein B denotes any one of an alkylidene group, an allylene group, and an allylene dialkylidene group; R13 to R16 individually denote any one of a hydrogen atom, an alkyl group, an aryl group, and a halogen atom.

Specific examples of the bisphenol compound (B) represented by the above formula are shown below.

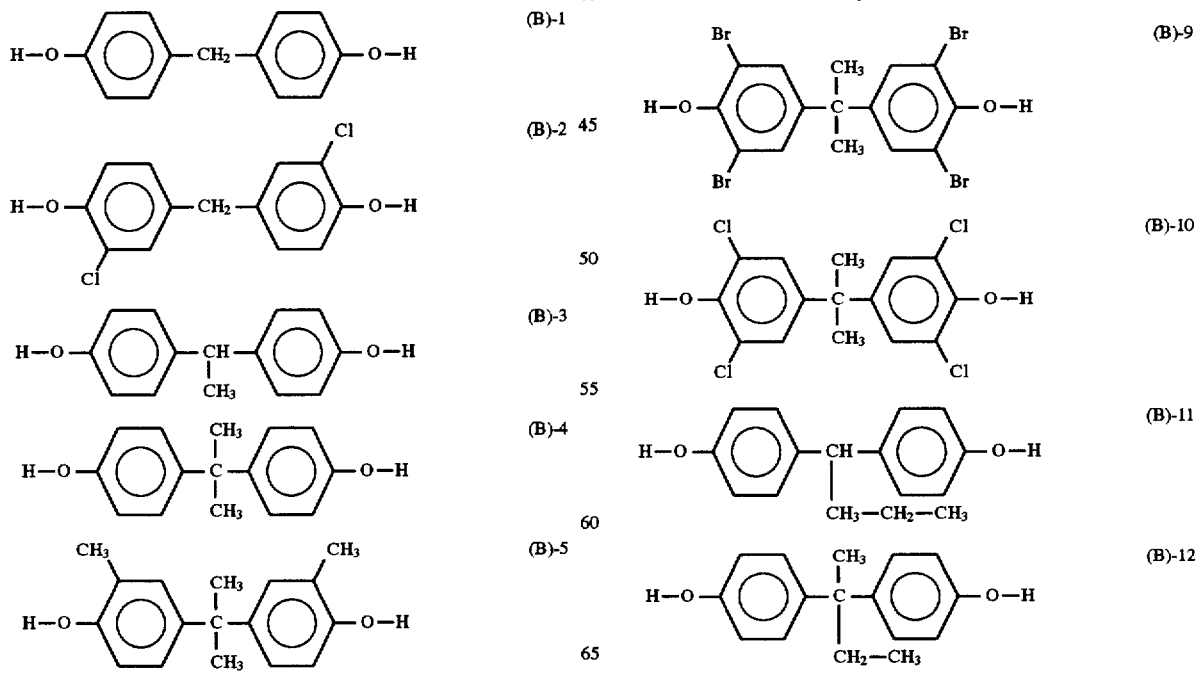

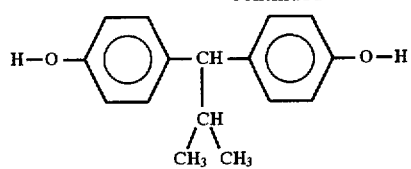 (B)-13
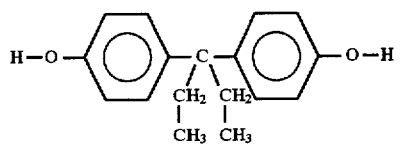 (B)-14
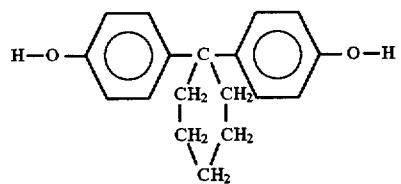 (B)-15
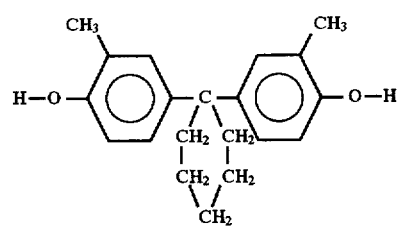 (B)-16
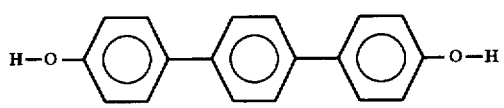 (B)-17
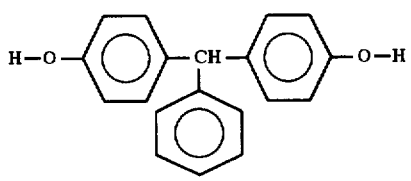 (B)-18
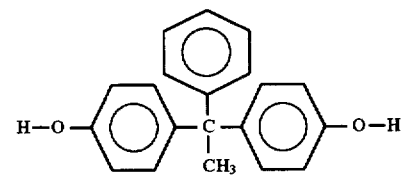 (B)-19
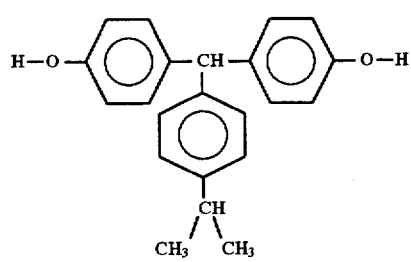 (B)-20
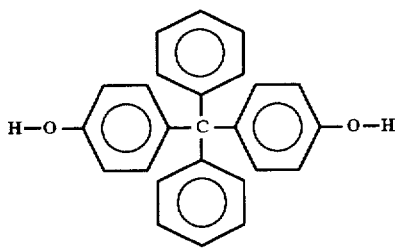 (B)-21
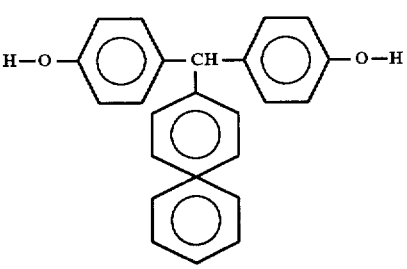 (B)-22
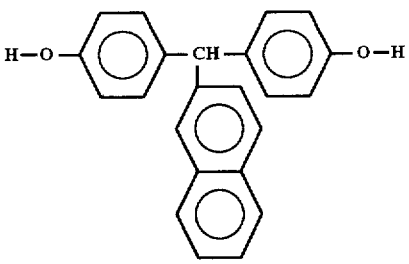 (B)-23
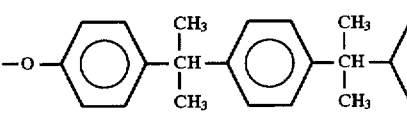 (B)-24
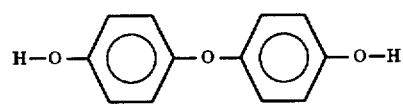 (B)-25
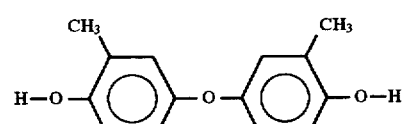 (B)-26
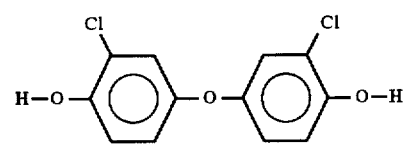 (B)-27
(B)-28

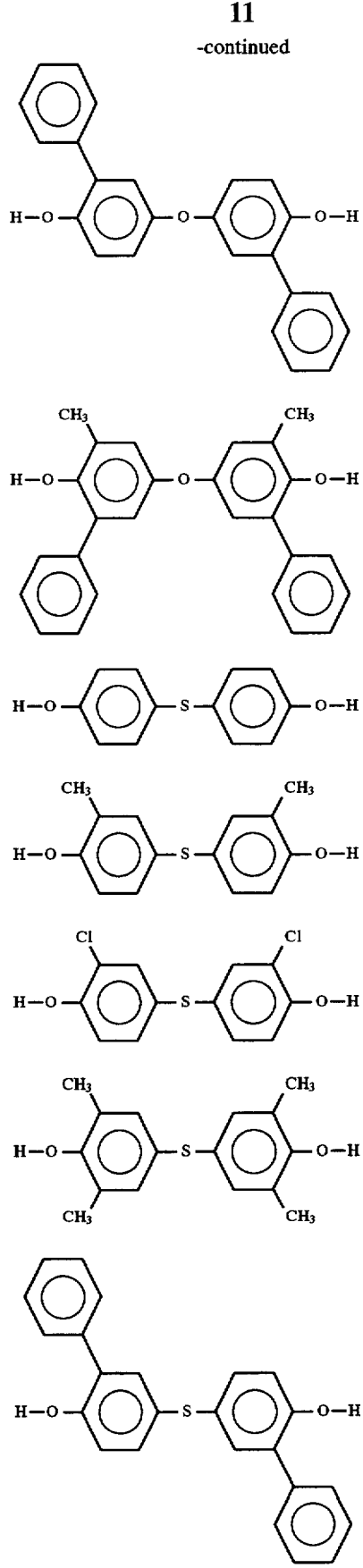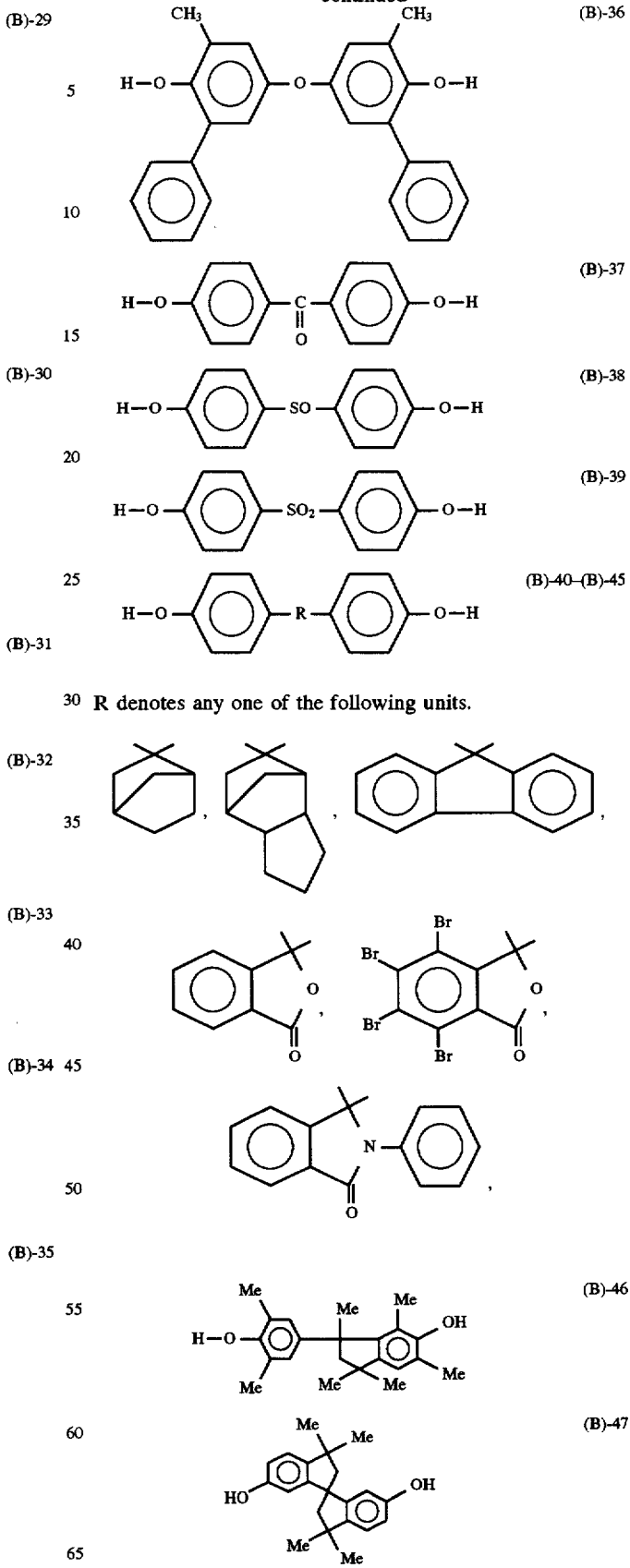
R denotes any one of the following units.

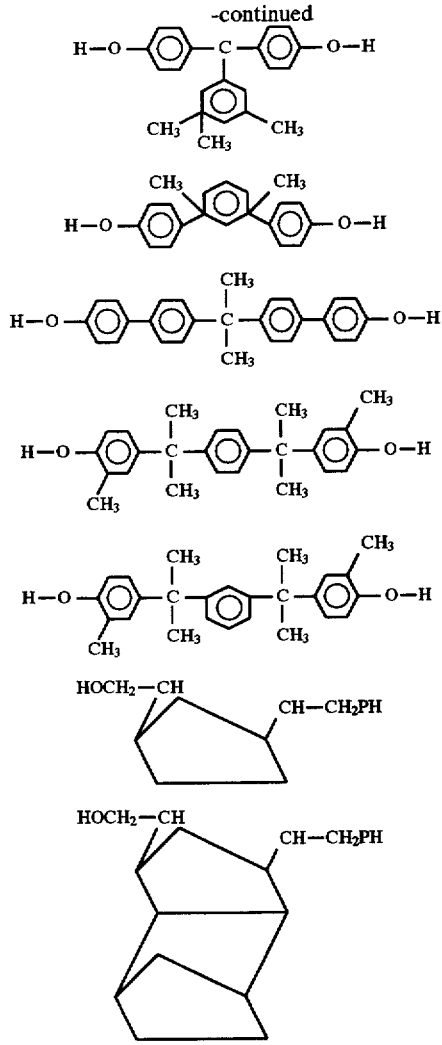

(B)-48
(B)-49
(B)-50
(B)-51
(B)-52
(B)-53
(B)-54 and stability of the coating liquid, improving compatibility of the charge transport substance with the binder resin, and enabling to fabricate the charge transport layer having high wear characteristics, excellent crack resistance, and excellent response characteristics with high productivity.

Now, synthetic examples of the copolymer polycarbonate used by the present invention and examples of the photoconductor of the present invention will be described in greater detail but the present invention is not limited thereto.

SYNTHETIC EXAMPLES

SYNTHETIC EXAMPLE OF BISPHENOL COMPOUND (A)-1

1.0 mol of potassium carbonate and 2 kg of sulfolane as a solvent were added to 1.0 mol of 2,2-bis(4-hydroxyphenyl)propane and 0.5 mol of 4,4'-difluorobenzophenone. The mixture was reacted while stirring it at the temperature of 230° C. for 2 hours. A product was washed off with a large quantity of water and thereafter dried. After drying, dissolution with tetrahydrofuran and wash were repeated. A white solid was obtained. The white solid was analyzed by means of GPC. As a result, it was found that the white solid is represented by the following formula (as given in the specific example (A)-1 in the preceding paragraph); and

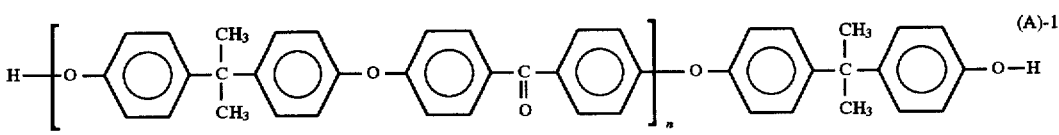

With respect to a copolymerization ratio of the copolymer polycarbonate resin of the present invention, the content of a component represented by the constitutional unit represented by the formula (I) is preferably 1 to 60 percent by weight, and more preferably, 5 to 50 percent by weight based upon the total amount of the resin. Further, it is desirable that its molecular weight is 100,000 to 200,000 in terms of polystyrene conversion average molecular weight (Mw) as measured by a gel permeation chromatography (GPC).

At least one of the constitutional unit represented by the formula (I) and at least one of the constitutional unit represented by the formula (II) is introduced into polycarbonate resin, thereby giving suitable flexibility to the polycarbonate resin, improving wear characteristics, degrading resin crystallizability, improving solvent solubility characteristics, and further, improving compatibility with charge transport substance. The polycarbonate resin of the present invention is mixed into the binder resin of the charge transport layer which is formed as an outermost layer of the photoconductor, thereby improving the solvent solubility and that the white solid is a mixture which contains 56 percent by weight of a compound, 24 percent by weight of a compound, and 4 percent by weight of a compound, all of which are represented by the above formula with n being 1, 2, and 3, respectively, and 6 percent by weight of 2,2-bis(4-hydroxyphenyl)propane.

SYNTHETIC EXAMPLE OF BISPHENOL COMPOUND (A)-2

1.05 mol of potassium carbonate and 2 kg of sulfolane as a solvent were added to 1.0 mol of 2,2-bis(4-hydroxyphenyl)propane and 0.5 mol of 4,4'-difluoroisophthalophenone. The mixture was reacted while stirring it at the temperature of 250° C. for 3 hours. A product was washed off with a large quantity of water and thereafter dried. After drying, dissolution with tetrahydrofuran and wash were repeated. A white solid was obtained. The white solid was analyzed by means of GPC. As a result, it was found that the white solid is represented by the following formula (as given in the specific example (A)-2 in the preceding paragraph);

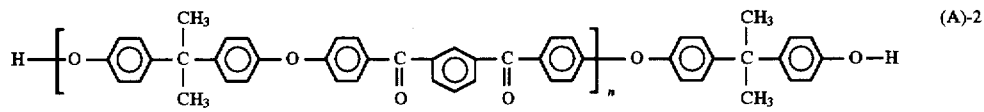

and that the white solid is a mixture which contains 63 percent by weight of a compound, 31 percent by weight of a compound, and 3 percent by weight of a compound, all of which are represented by the above formula with n being 1, 2, and 3, respectively, and 3 percent by weight of 2,2-bis(4-hydroxyphenyl)propane.

SYNTHETIC EXAMPLE OF BISPHENOL COMPOUND (A)-3

1.05 mol of potassium carbonate and 2 kg of sulfolane as a solvent were added to 1.0 mol of 2,2-bis(4-hydroxyphenyl)hexafluoropropane and 0.5 mol of 4,4'-difluorobenzophenone. The mixture was reacted while stirring it at the temperature of 230° C. for 3 hours. A product was washed off with a large quantity of water and thereafter dried. After drying, dissolution with tetrahydrofuran and wash were repeated. A white solid was obtained. The white solid was analyzed by means of GPC. As a result, it was found that the white solid is represented by the following formula (as given in the specific example (A)-3 in the preceding paragraph);

the temperature of 20° C. for 3 hours. After the reaction, a product is diluted with 400 ml of methylene chloride, and washed off successively with 4 liters of water, then, 2 liters of 0.01N hydrochloric acid, and 4 liters of water in this sequence. A resultant organic layer is poured into 10 liters of methanol to precipitate a white polymer. After the precipitate is filtrated, the filtrated solid content was dried at the temperature of 100° C. for 12 hours. About 180 grams of copolymer polycarbonate resin was obtained. As a result of measurement by means of GPC, its molecular weight (Mw) was 25,000.

SYNTHETIC EXAMPLES (2) and (3) OF COPOLYMER POLYCARBONATE RESIN

Copolymer polycarbonate resins were prepared in the same manner as in the synthetic example (1) of copolymer polycarbonate resin except that bisphenol (A)-2 and bisphenol (A)-3 were respectively used in replacement of bisphenol (A)-1. As a result of measurement by means of GPC, their molecular weights (Mw) were 30,000, and 34,000, respectively.

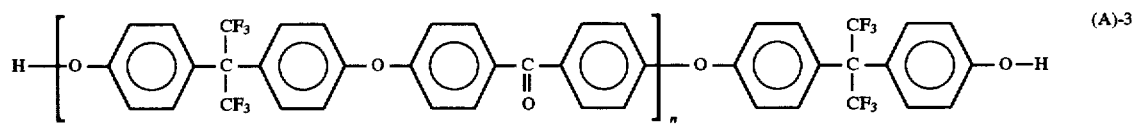

and that the white solid is a mixture which contains 54 percent by weight of a compound, 21 percent by weight of a compound, 14 percent by weight of a compound, and 5 percent by weight of a compound, all of which are represented by the above formula with n being, 1, 2, 3, and 4, and 6 percent by weight of 2,2-bis(4-hydroxyphenyl)hexafluoropropane.

SYNTHETIC EXAMPLE OF POLYCARBONATE RESIN (1)

A solution was prepared by adding 1000 ml of aqueous NaOH having a 5% concentration and 2000 ml of metylene chloride to 100 parts by weight of the bisphenol compound (A)-1 previously synthesized and 100 parts by weight of 1,1-bis(4-hydroxyphenyl)cyclohexane which is the bisphenol compound (B)-15. $COCl_2$ gas was blown into this solution at a rate of 500 ml/min. for 1 hour while vigorously stirring it and keeping a reaction temperature at 15° C. Then, 500 ml of aqueous NaOH having a 10% concentration, 2 grams of trimethylbenzil ammonium chloride, and 3 ml of triethylamine were further added thereto, while stirring it at

EXAMPLES 1 to 3

2.1 parts by weight of a bisazo compound expressed by the following constitutional formula (C), 1.0 part by weight of polyvinyl acetal (S-LEC KS-1 manufactured by Sekisui Chemical Co., Ltd.), 16 parts by weight of methyl ethyl ketone and 9 parts by weight of cyclohexanone were mixed together. The resultant mixture was dispersed by a sand mill, and further mixed with 75 parts by weight of methyl ethyl ketone, thereby preparing a coating liquid. An aluminum cylinder (60 mm in outer diameter, 348 mm in length and 1 mm in thickness) having a 0.5 μm-thick layer of a soluble polyamide resin (Daiamid T-171 manufactured by Daicel-Hüles) as an undercoat layer was coated at the outer periphery thereof with the coating liquid, thereby obtaining a charge generation layer having a dry thickness of 0.2 μm.

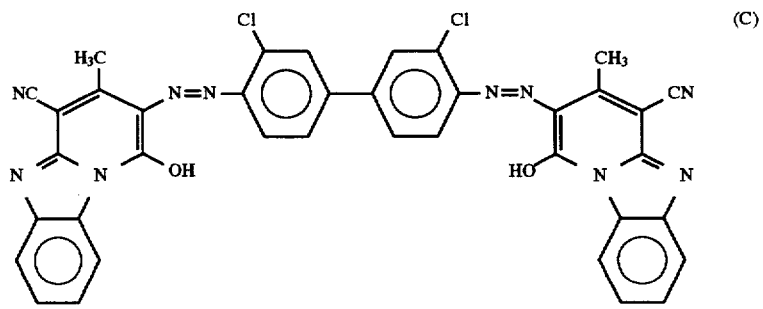

7 parts by weight of a charge transport substance expressed by the following constitutional formula (D), 3 parts by weight of another charge transport substance expressed by the following constitutional formula (E) and 10 parts by weight of the copolymer polycarbonate resin prepared in the synthetic example (1) were dissolved into 80 parts by weight of tetrahydrofuran, thereby preparing a coating liquid (1) for a charge transport layer. In the same manner, coating liquids (2) and (3) for charge transport layers were prepared by using the copolymer polycarbonate resins synthesized in the synthetic examples (2) and (3), respectively, in place of the copolymer polycarbonate resin synthesized in the synthetic example (1). The charge generation layer was coated with the coating liquid, thereby forming a charge transport layer of a dry thickness of 30 μm. In this way, photoconductors in the examples 1 to 3 could be fabricated.

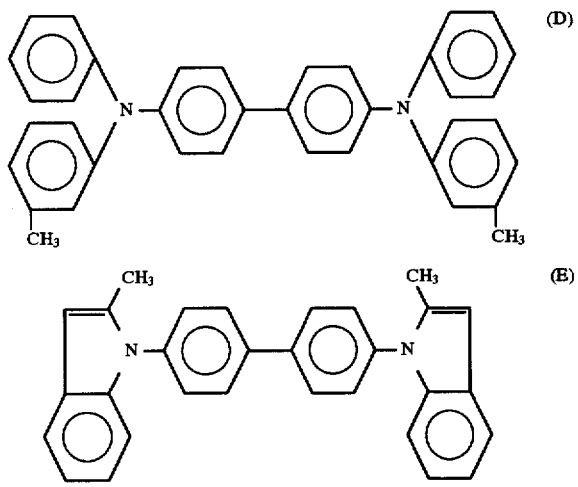

COMPARATIVE EXAMPLES 1 to 3

Coating liquids (4), (5) and (6) for a charge transport layer were prepared in the same manner as in the examples 1 to 3 except that the polycarbonate resins of the synthetic examples 1 to 3 used in the examples 1 to 3 were replaced with polycarbonate resins each having a molecular weight (Mw) of 40,000 or less and expressed by the formulas (F)-1 to (F)-3, respectively. Photoconductors in the comparative examples 1 to 3 were fabricated in the same manner as the examples 1 to 3 except for replacement of the coating liquids (1) to (3) with the coating liquids (4) to (6), respectively.

Stability of each coating liquid for the charge transport layer was observed and evaluated after it was left at room temperature for one day. Moreover, a glass plate was coated with each coating liquid, and then, fingerprints were put on the glass plate. Generation of cracks was observed and evaluated after the glass plate was left for one day in the atmosphere of a temperature of 60° C. and a relative humidity of 90%. The evaluation results are shown in Table 1.

TABLE 1

|  | STABILITY OF COATING LIQUID | GENERATION OF CRACKS |
| --- | --- | --- |
| EXAMPLE 1 | GOOD | NO |
| EXAMPLE 2 | GOOD | NO |
| EXAMPLE 3 | GOOD | NO |
| COMPARATIVE EXAMPLE 1 | CLOUDY AFTER ONE DAY | MUCH |
| COMPARATIVE EXAMPLE 2 | GOOD | MIDDLE |
| COMPARATIVE EXAMPLE 3 | CLOUDY AFTER ONE DAY | MUCH |

Effects of using the copolymer polycarbonate resin according to the present invention are obvious from Table 1.

The photoconductors of the examples 1 to 3 and the comparative examples 1 to 3 were mounted on a copying machine for ordinary paper currently on the market (e.g., FP-3380 manufactured by Matsushita Electric Industrial Co., Ltd.). A printing test of 100,000 copies was carried out for checking a change in electric characteristics, a decrease in film thickness and variations of an image quality. The results are shown in Table 2.

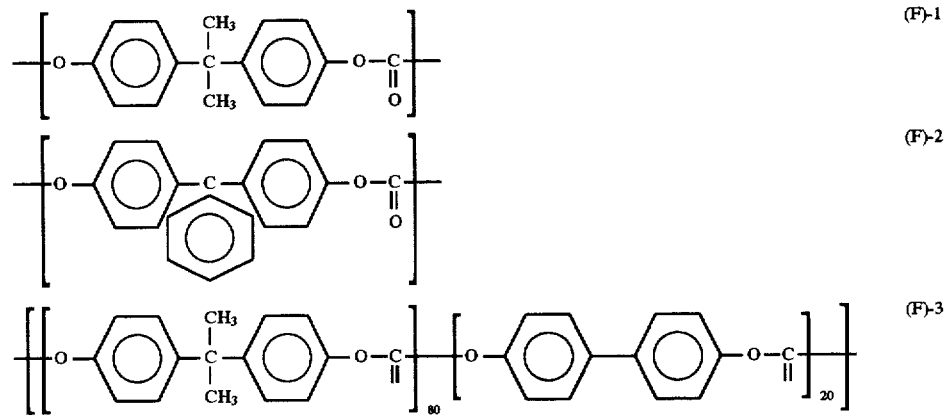

TABLE 2

| | INITIAL CHARACTERISTICS | | | | CHARACTERISTICS AFTER PRINTING TEST OF 100,000 COPIES | | | |
|---|---|---|---|---|---|---|---|---|
| | LIGHT POTENTIAL (V) | DARK POTENTIAL (V) | THICKNESS (µM) | IMAGE QUALITY | LIGHT POTENTIAL (V) | DARK POTENTIAL (V) | THICKNESS (µM) | IMAGE QUALITY |
| EXAMPLE 1 | −700 | −65 | 30 | GOOD | −695 | −70 | 29 | GOOD |
| EXAMPLE 2 | −700 | −55 | 30 | GOOD | −690 | −60 | 29 | GOOD |
| EXAMPLE 3 | −700 | −50 | 30 | GOOD | −695 | −55 | 30 | GOOD |
| COMPARATIVE EXAMPLE 1 | −700 | −70 | 30 | GOOD | −580 | −80 | 23 | HOLLOWS |
| COMPARATIVE EXAMPLE 2 | −700 | −50 | 30 | GOOD | −600 | −60 | 24 | MANY SPOTS |
| COMPARATIVE EXAMPLE 3 | −700 | −50 | 30 | GOOD | −650 | −58 | 25 | MANY SPOTS |

As is obvious from Table 2, the photoconductors of the comparative examples 1 to 3 possess drawbacks such as a large decrease in dark potential or thickness, and defects such as spots or hollows which reduce an image quality in comparison with those of the examples 1 to 3. As a result, it is clear that the copolymer polycarbonate resins according to the present invention produce superior effects.

Obviously from the above description, when the charge transport layer as the outermost layer of the laminate type photoconductor includes the polycarbonate resin according to the present invention, it is possible to form the layer excellent in solvent crack resistance, stress crack resistance and abrasion resistance. Consequently, it is possible to provide the photoconductor for electrophotography, excellent in mechanical characteristics and durability with little fluctuation of electric characteristics, in which film abrasion by cleaning can be restrained to the minimum and surface flaws liable to influence a copied image are difficult to occur. The polycarbonate resin according to the present invention is more excellent in solubility in the charge transport substance than other binder polymers, thus forming the charge transport layer having a remarkably favorable responsiveness. As a result, it is possible to provide the photoconductor which can be suitably used in high speed electrophotography.

Additionally, the polycarbonate resin according to the present invention is excellent in solubility in organic solvents, and further, exhibits high solubility in a nonhalogen-based solvent such as 1,4-dioxane or tetrahydrofuran. The coating liquid can be prepared by using such a solvent with few problems from the viewpoints of safety and sanitation. Moreover, since stability with time of the coating liquid is excellent, generation of defects at the time of coating can be prominently reduced so as to remarkably enhance productivity of the photoconductor.

The present invention has been described in detail with respect to preferred embodiments, and it will now be clear that changes and modifications may be made without departing from the invention in its broader aspects, and it is our intention, therefore, in the appended claims to cover all such changes and modifications as fall within the true spirit of the invention.

What is claimed is:

1. A photoconductor, comprising:
   a conductive substrate; and
   a photosensitive layer which is formed on the conductive substrate and which comprises a charge generation layer and a charge transport layer each comprised mainly of organic material,
   wherein the charge transport layer is formed as an outermost layer of the photosensitive layer and includes a copolymer polycarbonate resin containing at least one constitutional unit represented by formula (1) and at least one constitutional unit represented by formula (2):

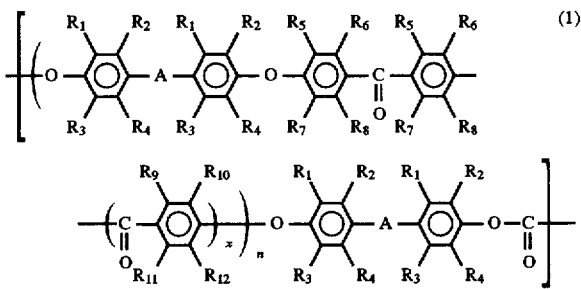

where A denotes any one of an alkylidene group, a cycloalkylidene group, an allylene group, and an allylene dialkylidene group; R1 to R12 individually denote any one of a hydrogen atom, an alkyl group, an aryl group, and a halogen atom; x is an integer and is 0 or 1; and n is an integer ranging from 1 to 100, and

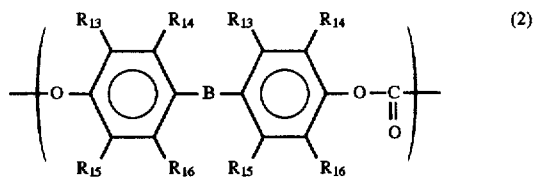

where B denotes any one of an alkylidene group, a cycloalkylidene group, an allylene group, and an allylene dialkylidene group; R13 to R16 individually denote any one of a hydrogen atom, an alkyl group, an aryl group, and a halogen atom.

2. The photoconductor as set forth in claim 1, wherein the constitutional unit represented by formula (1) is present in an amount ranging from 1 to 60 percent by weight based upon a total amount of the copolymer polycarbonate resin.

3. The photoconductor as set forth in claim 1, wherein the constitutional unit represented by formula (1) is present in an amount ranging from 5 to 50 percent by weight based upon a total amount of the copolymer polycarbonate resin.

4. The photoconductor as set forth in claim 1, wherein the copolymer polycarbonate resin has a molecular weight ranging from 100,000 to 200,000 in polystyrene weight-average molecular weight.

* * * * *